Figure 1:
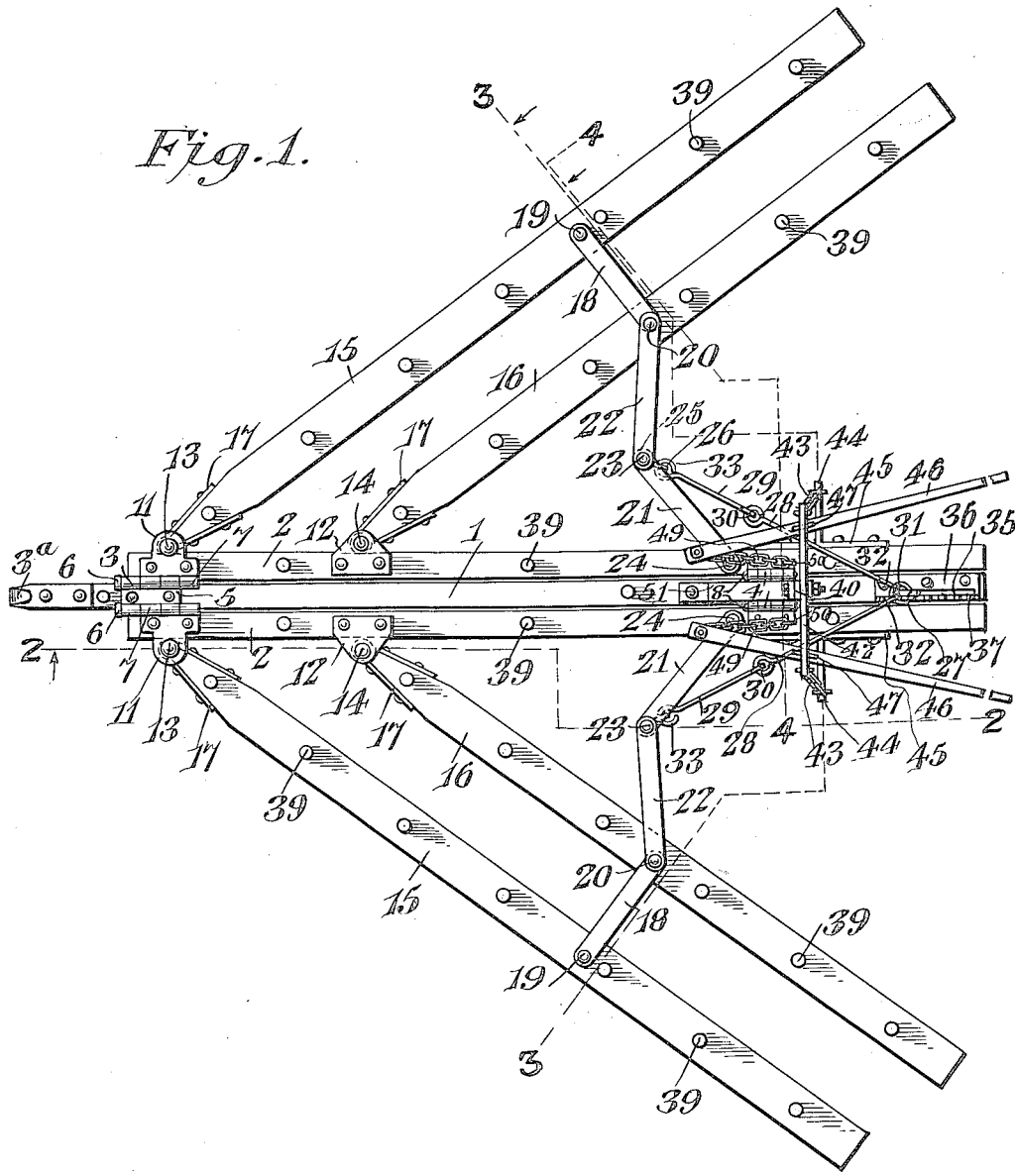

D. C. SMITH.
HARROW.
APPLICATION FILED MAY 17, 1912.

1,042,493.

Patented Oct. 29, 1912.

2 SHEETS—SHEET 1.

WITNESSES

D. C. Smith, INVENTOR

BY

ATTORNEY

D. C. SMITH.
HARROW.
APPLICATION FILED MAY 17, 1912.
1,042,493.
Patented Oct. 29, 1912.
2 SHEETS—SHEET 2.
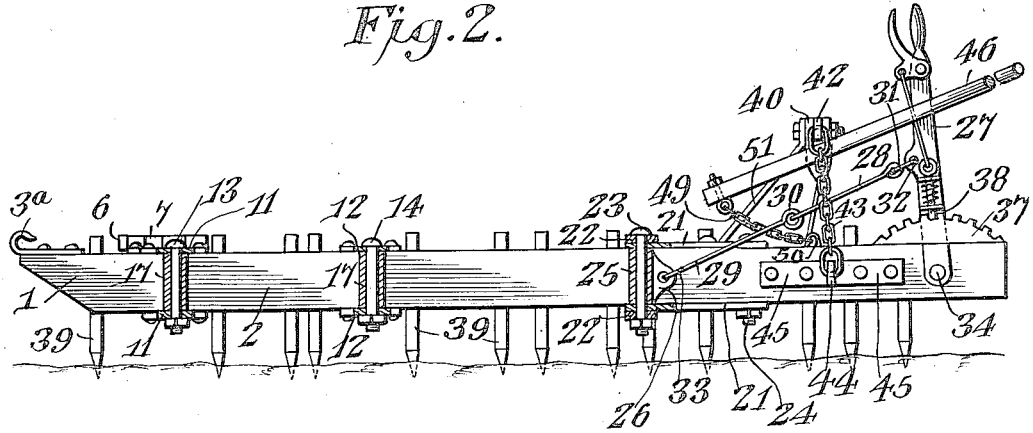
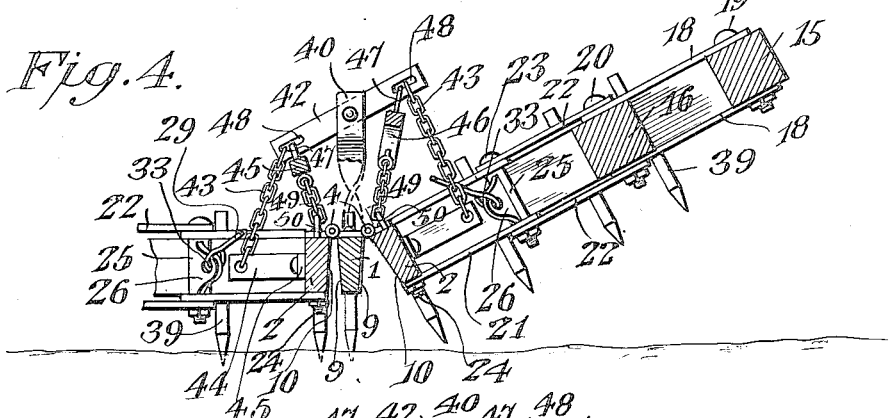
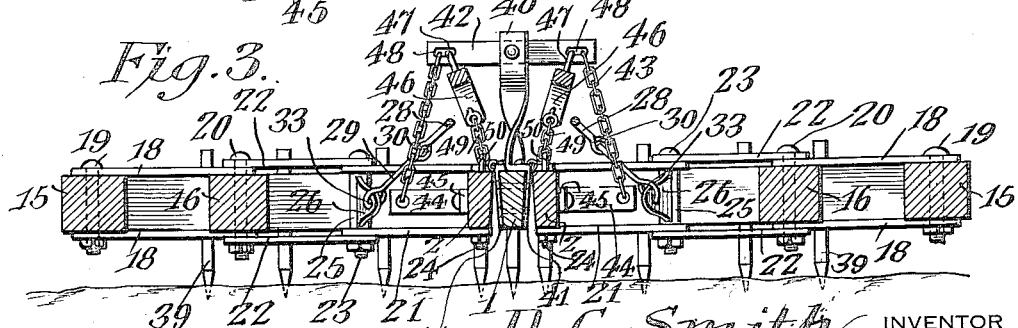

UNITED STATES PATENT OFFICE.

DAVID C. SMITH, OF BEE BRANCH, ARKANSAS.

HARROW.

1,042,493.  Specification of Letters Patent.  Patented Oct. 29, 1912.

Application filed May 17, 1912. Serial No. 698,049.

*To all whom it may concern:*

Be it known that I, DAVID C. SMITH, a citizen of the United States, residing at Bee Branch, in the county of Van Buren and State of Arkansas, have invented a new and useful Harrow, of which the following is a specification.

The invention relates to improvements in harrows.

The object of the present invention is to improve the construction of harrows, and to provide a simple, practical and comparatively inexpensive harrow, capable of being readily adjusted to vary its width to suit the conditions or requirements, and adapted to be easily operated to raise either side to clear a stump or other obstruction without interfering with the other side.

A further object of the invention is to provide an adjustable harrow of this character, adapted to permit either side to drop below the normal horizontal plane of the other side in order to harrow the soil in low places.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a harrow, constructed in accordance with this invention. Fig. 2 is a longitudinal sectional view on the line 2—2 of Fig. 1. Fig. 3 is a transverse sectional view on the line 3—3 of Fig. 1. Fig. 4 is a similar view on the line 4—4 of Fig. 1, one of the sides of the harrow being swung upwardly.

Like numerals of reference designate corresponding parts in all the figures of the drawings.

In the accompanying drawings in which is illustrated the preferred embodiment of the invention, 1 designates a central longitudinal main beam having its front end tapered and extended in advance of a pair of longitudinal beams 2 and equipped with a clevis 3ª for the attachment of the draft animal or animals. The longitudinal beams 2, which are located at opposite sides of the central main beam 1, are hinged to the same by front and rear hinges 3 and 4, adapted to swing upwardly and downwardly to raise or lower either side of the beam. The front hinge comprises a central leaf 5 secured to the upper edge of the main beam 1 and provided at the side faces thereof with eyes for the reception of pintle rods 6, which also pass through eyes of side leaves 7, secured to the upper edges of the hinged longitudinal beams 2. The rear hinge also consists of central and side leaves, provided with registering eyes located at the side faces of the main beam 1 and connected by pintle rods 8. The central beam is tapered from its upper edge to its lower edge and presents inclined side faces 9 to the hinged longitudinal beams 2, which are tapered from their upper edges to their lower edges to provide inner inclined side faces 10. This arrangement permits either side of the harrow to drop below a horizontal position in order that the harrow may operate properly on the soil in low places.

The hinged longitudinal beams are provided at opposite sides with spaced upper and lower laterally extending ears 11 and 12 for the reception of vertical pintles 13 and 14, which pass through vertical eyes or openings at the front ends of laterally adjustable beams 15 and 16, arranged in pairs and located at opposite sides of the hinged longitudinal bars. The laterally extending ears 11 are formed integral with the side leaves 7, and the other ears 12 consist of plates secured to the upper and lower edges of the beams 2. The front ends of the laterally adjustable beams 15 and 16 are tapered, and the eyes or openings of the said beams 15 and 16 are formed by metallic straps 17, bent at an intermediate point to form two sides arranged at an angle to each other and secured to the side faces of the tapered front ends of the laterally adjustable beams.

The pivots of the laterally adjustable beams space the front ends thereof and the said beams are also spaced at their rear portions by upper and lower transverse connecting bars 18, fitted against the upper and lower edges of the beams 15 and 16 and secured to the same by vertical pivots 19 and 20, which extend entirely through the beams 15 and 16 and pierce the terminals of the bars 18. The pivots of the bars 18 permit the latter to adjust themselves to the position of the beams 15 and 16 in the adjustment thereof.

The laterally adjustable side beams are also connected with the rear portions of the hinged longitudinal beams by upper and lower angularly related links 21 and 22, located at the upper and lower edges of the said beams and arranged in pairs, the members of each pair being connected together by a vertical pivot 23, which extends through the contiguous terminals of the upper and lower links. The links 21 are secured to the hinged longitudinal beams by pivots 24, and they extend forwardly and outwardly therefrom. The other links 22 are pivoted at their outer ends to the laterally adjustable side beams 16 by the said pivots 20, and they extend forwardly and inwardly from the said beams 16, the pivot 23 being preferably located in advance of a line intersecting the pivots 20 and 24. By this construction the resistance to the forward movement of the laterally adjustable beam when the harrow is drawn forwardly will operate to swing the same inwardly toward the hinged beams, and the laterally adjustable beams are forced outwardly by the hinged beams by drawing the pivots 23 rearwardly.

The vertical pivots 23 carry spacing sleeves 25 provided with rearwardly projecting ears 26, and connected with an upright operating lever 27 by rods 28 and 29. The rods 28 and 29 are arranged in pairs and form flexible connections, which diverge forwardly from the upright lever 27, as clearly illustrated in Fig. 1 of the drawings. The rods are provided at their connected ends with eyes 30, which are linked into each other; the rear rods 28 have eyes, which are linked into a ring 31, which passes through a perforation of an ear 32 of the lever. The front ends of the front rods 29 are provided with eyes 33, which are linked into the perforations of the ears 26. The lever 27 is pivoted at its lower end to the main beam at one of the side faces thereof by a pin or bolt 34, and it extends upwardly through a slot 35 of a bracket 36, secured to the upper edge of the central beam 1 at the rear end thereof and provided with a toothed segment 37, adapted to be engaged by a spring actuated dog or detent 38 of the operating lever 27. The dog or detent 38, which is controlled by a latch lever of the ordinary construction, locks the beams in their adjustment.

The central and hinged longitudinal beams and the laterally adjustable side beams are equipped with suitable harrow teeth 39, which may be constructed in any suitable manner and arranged at any desired intervals. The teeth of the laterally adjustable side beams 16 harrow between the teeth of the side beams 15, and the teeth of the central and hinged longitudinal bars harrow centrally between the side beams. The adjustment of the side beams varies the width of the harrow and the effective interval between the teeth of those beams.

The central beam 1 is equipped at its rear portion with a vertical standard 40, provided at the lower end with attaching portions 41, which are suitably secured to the beam 1 at opposite sides thereof. The upper end of the standard is provided with a transverse bifurcation in which is centrally pivoted a transverse lever 42, extending from opposite sides of the standard and connected at its terminals by chains 43, or other suitable flexible connections with the outer portions of arms 44 of the hinged longitudinal beams. The arms 44, which project horizontally from the outer side faces of the beams 2, have inner attaching portions 45, and they also form stops for limiting the inward movement of the laterally extending bars so as to space the same from the longitudinal beams 2 when at the limit of their inward movement. The transverse lever is adapted to be oscillated, as illustrated in Fig. 4 of the drawings, to tilt the hinged beam and the laterally extending side bars to elevate either side of the harrow for enabling the same to clear a stump or other obstruction. The transverse lever is oscillated by means of a pair of longitudinally operating levers 46, extending beneath the transverse bar and provided at points intermediate of their ends with eyes 47, which are linked into slots 48 of the transverse lever. The operating levers have relatively long rear arms and relatively short front arms, which are connected by chains 49, or other suitable flexible connections with the hinged side beams. The hinged longitudinal beams are provided in advance of the laterally extending arms with eyes 50 to receive the lower ends of the chains 49. When the rear handle portion of the operating lever 46 at one side of the standard is depressed the adjacent arm of the transverse lever will be swung downwardly, and the other arm of the transverse lever will be swung upwardly and will carry with it the side of the harrow to which it is connected. By this construction and arrangement, the operating lever at one side of the standard is adapted to raise and lower the opposite side of the harrow. The standard is supported by an inclined brace 51, located in advance of the standard and secured at its upper end to the same and at its lower end to the central beam in advance of the inner ends of the links 21.

What is claimed is:—

1. A harrow comprising a main central beam, longitudinal beams located at opposite sides of and hinged to the central beam and arranged to swing upwardly and downwardly, a transverse lever carried by the central beam and fulcrumed intermediate of its ends to form opposite arms, means for connecting the arms of the transverse lever with the longitudinal beams, and means for operating the transverse lever for raising and lowering either of the said longitudinal beams.

2. A harrow including a main longitudinal beam tapered downwardly toward its lower edge and presenting inclined side faces, longitudinal beams hinged at their upper edges to the upper edges of the main beam and having inclined inner side faces, and side beams connected with and carried by the hinged longitudinal beams, the said inclined faces permitting the side beams to drop below a horizontal position.

3. A harrow including a central portion, laterally adjustable side beams pivotally connected with the central portion, angularly related links arranged in pairs and pivotally connected with the side beams and the central portion of the harrow and provided at their adjacent ends with vertical pivots, sleeves mounted on the latter and provided with ears, an operating lever pivotally mounted at the central portion of the harrow, and connections extending from the lever to the ears of the said sleeves.

4. A harrow including hinged longitudinal beams arranged to swing upwardly and downwardly, laterally adjustable side beams pivotally connected with the hinged longitudinal beams, arms extending laterally from the hinged beams and forming stops for limiting the inward movement of the side beams, and operating means connected with the arms for raising the said beams.

5. A harrow including a central main beam, longitudinal beams arranged in substantially the same horizontal plane as the central main beam, hinges arranged at the upper edges of the central and longitudinal beams and connecting the same, harrow teeth carried by the central and longitudinal beams, and operating mechanism for raising and lowering the longitudinal beams.

6. A harrow including a central main beam, longitudinal beams hinged to the central beam at opposite sides thereof and arranged to swing upwardly and downwardly, side beams carried by the hinged beams, a standard mounted on the central beam, a transverse lever fulcrumed on the standard and extending from opposite sides thereof, means for connecting the transverse lever with the hinged beams, and operating levers disposed longitudinally of the harrow and connected with the transverse lever and adapted to tilt the same for raising and lowering the hinged and side beams.

7. A harrow including a central main beam, longitudinal beams hinged to the central beams at opposite sides thereof and arranged to swing upwardly and downwardly, side beams carried by the hinged beams, a standard mounted on the central beam, arms extending laterally from the side beams, a transverse lever fulcrumed on and projecting from opposite sides of the standard, means for connecting the transverse lever with the laterally projecting arms, and means for oscillating the transverse lever to raise and lower the hinged and side beams.

8. A harrow including a central main beam, longitudinal beams hinged to the central beam at opposite sides thereof and arranged to swing upwardly and downwardly, side beams carried by the hinged beams, a standard mounted on the central beam, arms extending laterally from the side beams, a transverse lever fulcrumed on and projecting from opposite sides of the standard, means for connecting the transverse lever with the laterally projecting arms, and operating levers located at opposite sides of the standard and connected at an intermediate point with the transverse lever and at their front terminals with the hinged beams.

In testimony, that I claim the foregoing as my own, I have hereto affixed my signature in the presence of two witnesses.

DAVID C. SMITH.

Witnesses:
J. Y. CHILDRESS,
H. A. McDOWON.